United States Patent Office 3,427,981
Patented Feb. 18, 1969

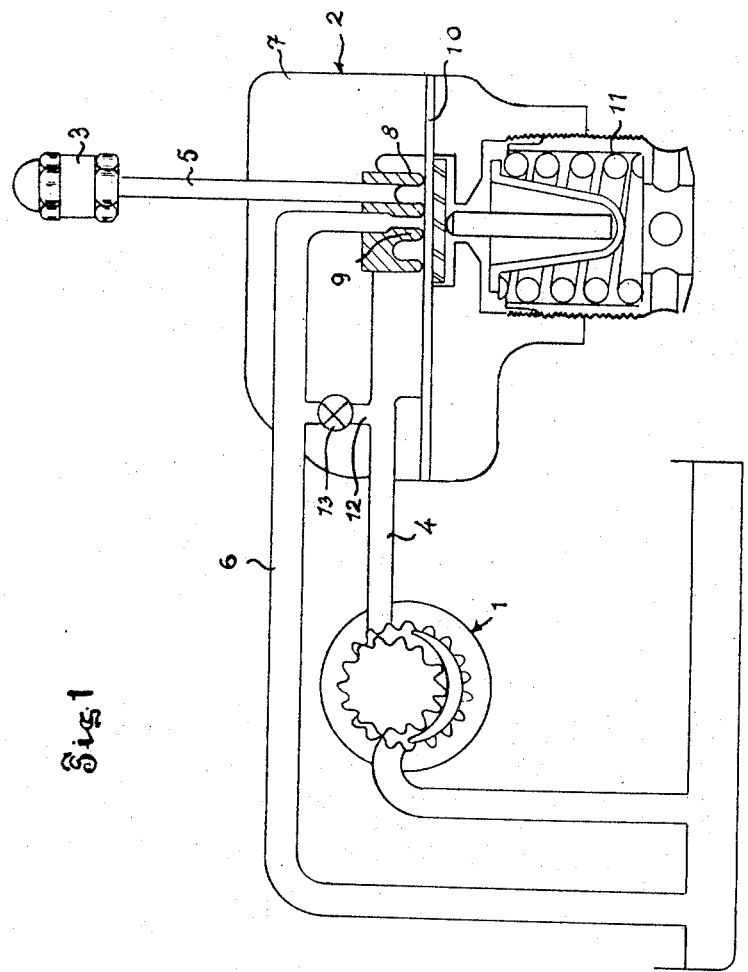

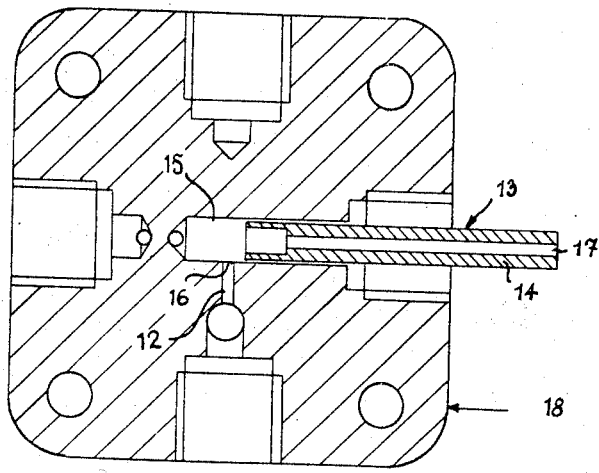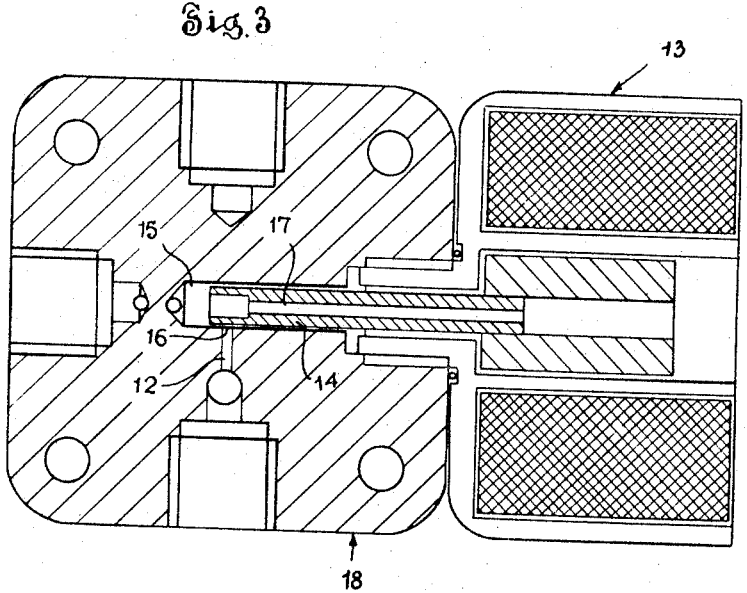

3,427,981
GEAR PUMP WITH VALVE MECHANISM
Sven Arne Martin Jansson, Norrviken, Sweden, assignor to System Paulin Aktiebolag, Stockholm, Sweden
Filed Jan. 27, 1967, Ser. No. 612,246
Claims priority, application Sweden, Jan. 31, 1966, 1,180/66
U.S. Cl. 103—41  1 Claim
Int. Cl. F04c 1/14, 29/08

ABSTRACT OF THE DISCLOSURE

A gear pump with a valve mechanism of the type which keeps constant the pressure of the liquid delivered by the gear pump to a place of consumption. The valve mechanism preferably comprises a main valve inserted in a conduit leading from the pressure side of the pump to the place of consumption, a pressure control valve inserted in the conduit leading from the pressure side of the pump back to the pump suction side, and a branch line equipped with a solenoid actuated valve and leading from the pump pressure side to the pump suction side.

---

In the prior art gear pumps with valve mechanisms a solenoid actuated valve was inserted in the conduit leading from the main valve to the place of consumption, but such arrangement has proved disadvantageous in several respects. Over these prior art devices the invention provides the following important advantages. The solenoid actuated valve can be manufactured at low costs since the requirement for tightness is not so high, considering that any oil leaking therethrough does not flow to the place of consumption but rather is returned to the suction side of the pump. At shut down of the pump a more definite cut-off of the oil is obtained since the main valve mechanism of the pump rather than the solenoid actuated valve effects said cut-off. Further, by maintaining the main valve closed and opening the solenoid actuated valve during start up, the usual bleeding of the pump is rendered unnecessary and a minimum of power is required to start the pump since no pressure is built up in the pump until the solenoid actuated valve is closed.

The solenoid actuated valve which, as suggested by this invention, is inserted in the bypass line leading from the pump pressure side to the pump suction side ensures that the supply of liquid to the place of consumption is interrupted immediately when the pump stops. This is accomplished by connecting the solenoid in the circuit of the pump motor so that de-energizing the motor circuit simultaneously opens the solenoid actuated valve. This immediate interruption of the liquid supply is of the utmost importance when the place of consumption is the oil atomizing nozzle of an oil burner. On the other hand, the solenoid actuated valve is controlled to close after the pump motor has started for a short time.

For better elucidation, the invention will be described more in detail in the following with reference to the accompanying drawing in which:

FIG. 1 is a diagrammatic view of a gear pump and the valves thereof;

FIGS. 2 and 3 are views of an embodiment, chosen by way of example, of the solenoid actuated valve proper, FIG. 2 showing the valve in open position and FIG. 3 showing it in closed position.

1 is the gear pump proper and 2 the valve mechanism which is adapted to keep constant the pressure of the liquid delivered from the gear pump 1 to the place of consumption 3.

The valve mechanism 2 comprises a main valve inserted in the conduit 4, 5 leading from the pump pressure side to the place of consumption 3 which is the oil atomizing nozzle of an oil burner, and a pressure control valve inserted in a conduit 6 leading from the pump pressure side back to the pump suction side.

The valve mechanism 2 embodies a valve housing 7 to which the conduit 4 is connected. Arranged in the valve housing 7 is an annular flange 8 which forms a stationary valve seat for the main valve. Disposed concentrically inside the flange 8 is a second annular flange 9 which forms a stationary valve seat for the pressure control valve. The space between the valve seats 8 and 9 is in communication via conduit 5 with the place of consumption 3, i.e. the oil atomizing nozzle, while the space inside the valve seat 9 is in communication via conduit 6 with the pump suction side.

A flexible diaphragm 10 of for example rubber is provided in the valve housing 7 and is common to the main valve and the pressure control valve inasmuch as the diaphragm co-acts with both valve seats 8 and 9. The diaphragm 10 is pressed in application with the valve seats 8, 9 by a spring mechanism 11 so that the valves are kept closed. However, the diaphragm 10 can be moved away from the valve seats 8, 9 against the action of the spring mechanism 11 by the liquid pressure prevailing in the housing 7 to open said valves when the liquid pressure reaches a predetermined value which has been adjusted with the aid of the spring mechanism 11.

According to the invention, the valve housing 7 has a branch, or bypass line 12 which is ahead of the valve mechanism 2, as viewed in the direction of flow, and which extends from the pump pressure side to the pump suction side. More particularly, the branch line 12 is run between the conduit 4 leading from the pump pressure side and the conduit 6 leading back to the pump suction side. The solenoid actuated valve 13 is disposed in said branch line 12 for controlling the flow of oil therethrough.

In the embodiment shown in FIGS. 2 and 3 the valve member 14 of the solenoid actuated valve 13 is a slide which is movable by the solenoid actuated between two extreme positions and which slideably engages the valve seat 15. In one extreme position, illustrated in FIG. 2, the slide 14 uncovers the opening 16 in the valve seat 15, and in the other extreme position, illustrated in FIG. 3, is closes said opening 16.

The valve seat 15 of the solenoid actuated valve 13 is constituted by a bore of round cross section in the valve housing, the opening 16 being provided in one side wall of the bore. The slide 14 which is movable in said bore also is of round cross section and of such dimensions as to fill out the bore. To permit liquid to flow freely through the slide in the open position into and out of the central chamber of the solenoid of the valve 13 the slide has a bore 17 extending therethrough. This precludes the possibility of oil leaking into the central chamber of the solenoid and interfering with movement of the slide.

The bore serving as valve seat 15 is provided in a body 18 having one pair of plane-parallel sides one of which cooperates with the gear pump 1 and the other with the member of the valve mechanism 2 having the diaphragm 10 and the spring mechanism 11. The body is equipped with the supply conduit to the suction side of the gear pump 1 the outlet 4, 5, the valve seats 8, 9, the return conduit 6 and the branch line 12 for the solenoid actuated valve 13.

The above embodiment of the invention was described for purposes of illustration rather than limitation. It will be obvious to those skilled in the art that various changes and modifications may be made within the scope of the appended claim.

What I claim and desire to secure by Letters Patent is:
1. In a fluid distributing system for delivering fuel oil to a burner nozzle under a substantially constant pressure, said system including a motor driven gear type rotary pump having an inlet and an outlet and operable to deliver fluid from a supply source at a predetermined rate, a pressure fluid conduit connecting said pump outlet to said burner nozzle, a pressure responsive outlet valve connected in said pressure fluid conduit, said outlet valve having a valve element normally resiliently urged to a closed position and movable to an open position by fluid pressure upon build up of a predetermined pressure in said fluid pressure conduit, pressure control valve means controlled by said outlet valve element to recirculate a portion of the fluid from said pump outlet to said supply source when said valve element is in said open position, and bypass means connected between said pump inlet and said pump outlet for bypassing fluid from said pump outlet to said pump inlet, the improvement wherein said bypass means comprises, a bypass conduit connecting said pressure fluid conduit to said pump inlet, and a solenoid actuated valve connected in said bypass conduit, said solenoid actuated valve being movable between a fully opened position permitting the entire pump discharge to be recirculated to said pump inlet and a fully closed position to prevent the flow of fluid from said pressure fluid conduit through said bypass conduit, said solenoid actuated valve being connected in the control circuit of the pump motor to move said solenoid actuated valve to said fully open position simultaneously with pump motor stoppage and to move said solenoid actuated valve to said fully closed position only after a lapse of a predetermined time after the pump motor is started.

References Cited

UNITED STATES PATENTS

| | | | |
|---|---|---|---|
| 1,790,547 | 1/1931 | La Pointe | 251—139 X |
| 1,793,252 | 2/1931 | Roth | 251—139 X |
| 2,654,323 | 10/1953 | Wahlmark | 103—41 X |
| 2,700,397 | 1/1955 | Compton | 103—41 X |
| 2,714,854 | 8/1955 | Tyler | 103—41 |
| 2,761,387 | 9/1956 | Gaubatz | 103—41 X |
| 2,988,279 | 6/1961 | Irwin | 103—41 X |
| 3,309,995 | 3/1967 | Tyler | 103—41 X |
| 3,339,492 | 9/1967 | Brown | 103—41 X |

DONLEY J. STOCKING, *Primary Examiner.*

W. J. KRAUSS, *Assistant Examiner.*

U.S. Cl. X.R.

103—126